(12) United States Patent
Ickes et al.

(10) Patent No.: US 11,662,300 B2
(45) Date of Patent: May 30, 2023

(54) APPARATUS FOR PERFORMING IN-SITU ADHESION TEST OF COLD SPRAY DEPOSITS AND METHOD OF EMPLOYING

(71) Applicant: Westinghouse Electric Company LLC, Cranberry Township, PA (US)

(72) Inventors: Michael R. Ickes, Pittsburgh, PA (US); Arash Parsi, Sarver, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days.

(21) Appl. No.: 17/753,844

(22) PCT Filed: Sep. 14, 2020

(86) PCT No.: PCT/US2020/050719
§ 371 (c)(1),
(2) Date: Mar. 16, 2022

(87) PCT Pub. No.: WO2021/055284
PCT Pub. Date: Mar. 25, 2021

(65) Prior Publication Data
US 2022/0349810 A1     Nov. 3, 2022

Related U.S. Application Data

(60) Provisional application No. 62/902,553, filed on Sep. 19, 2019.

(51) Int. Cl.
*G01N 19/04* (2006.01)
*C23C 24/04* (2006.01)
(Continued)

(52) U.S. Cl.
CPC ............. *G01N 19/04* (2013.01); *C23C 24/04* (2013.01); *G01N 3/08* (2013.01); *G01N 3/24* (2013.01); *G01N 2203/0025* (2013.01)

(58) Field of Classification Search
CPC ............. G01N 19/04; G01N 3/24; G01N 3/08; G01N 2203/0025; C23C 24/04
See application file for complete search history.

(56) References Cited

U.S. PATENT DOCUMENTS 3,987,669 A * 10/1976 Daneshy .................. G01N 3/08
                                                                        73/827
5,054,324 A * 10/1991 Pohl .......................... G01N 3/04
                                                                        73/859
(Continued)

FOREIGN PATENT DOCUMENTS

DE    102014225094 A1 *  6/2016   ............... G01N 3/08
EP       1309735 A2      5/2003
(Continued)

OTHER PUBLICATIONS

International Search Report and Written Opinion for International PCT Application No. PCT/US2020/050719, dated Sep. 14, 2020.
(Continued)

*Primary Examiner* — Jonathan M Dunlap
(74) *Attorney, Agent, or Firm* — K&L Gates LLP

(57) ABSTRACT

A testing arrangement and method of using in performing an in-situ adhesion test of a cold spray deposit on a surface of a structure. The testing arrangement includes a specimen member having a number of apertures defined therein and a loading arrangement coupled to the specimen member. The loading arrangement is configured to provide a mechanical force of a known magnitude to the specimen member. In performing an in-situ test of a cold spray deposit on a structure, the method includes positioning the testing arrangement with respect to a surface of the structure, depositing the cold spray deposit on the surface of the structure, and testing the adhesion of the cold spray deposit to the surface.

25 Claims, 8 Drawing Sheets

(51) Int. Cl.
*G01N 3/08* (2006.01)
*G01N 3/24* (2006.01)

(56) References Cited

U.S. PATENT DOCUMENTS

| | | | |
|---|---|---|---|
| 5,176,028 A * | 1/1993 | Humphrey | B29C 66/944 73/842 |
| 6,258,402 B1 | 7/2001 | Hussary et al. | |
| 6,365,222 B1 | 4/2002 | Wagner et al. | |
| 6,491,208 B2 | 12/2002 | James et al. | |
| 6,502,767 B2 | 1/2003 | Kay et al. | |
| 6,576,861 B2 | 6/2003 | Sampath et al. | |
| 6,640,635 B2 | 11/2003 | Nakatsuka | |
| 6,670,808 B2 | 12/2003 | Nath et al. | |
| 6,723,379 B2 | 4/2004 | Stark | |
| 6,759,085 B2 | 7/2004 | Muehlberger | |
| 6,777,930 B2 | 8/2004 | Fischer | |
| 6,780,458 B2 | 8/2004 | Seth et al. | |
| 6,845,929 B2 | 1/2005 | Dolatabadi et al. | |
| 6,872,425 B2 | 3/2005 | Kaufold et al. | |
| 6,876,195 B2 | 4/2005 | Pigelet et al. | |
| 6,895,066 B1 | 5/2005 | Busch et al. | |
| 6,928,132 B2 | 8/2005 | Droege | |
| 7,066,375 B2 | 6/2006 | Bolser | |
| 7,097,431 B2 | 8/2006 | Englander et al. | |
| 7,143,967 B2 | 12/2006 | Heinrich et al. | |
| 7,144,648 B2 | 12/2006 | Tawfik et al. | |
| 7,201,940 B1 | 4/2007 | Kramer | |
| 7,293,597 B2 | 11/2007 | Parko, Jr. et al. | |
| 7,360,678 B2 | 4/2008 | Pietruska et al. | |
| 7,367,488 B2 | 5/2008 | Payne et al. | |
| 7,388,369 B2 | 6/2008 | Edsinger et al. | |
| 7,393,559 B2 | 7/2008 | Groza et al. | |
| 7,402,277 B2 | 7/2008 | Ayer et al. | |
| 7,479,299 B2 | 1/2009 | Raybould et al. | |
| 7,543,764 B2 | 6/2009 | Haynes et al. | |
| 7,553,385 B2 | 6/2009 | Haynes | |
| 7,618,500 B2 | 11/2009 | Farmer et al. | |
| 7,621,466 B2 | 11/2009 | Ko et al. | |
| 7,626,124 B2 | 12/2009 | Okamoto | |
| 7,631,816 B2 | 12/2009 | Jabado et al. | |
| 7,632,592 B2 | 12/2009 | Vyas et al. | |
| 7,637,441 B2 | 12/2009 | Heinrich et al. | |
| 7,654,223 B2 | 2/2010 | Kim et al. | |
| 7,740,905 B2 | 6/2010 | Jabado et al. | |
| 7,753,653 B2 | 7/2010 | Cairo et al. | |
| 7,757,652 B2 | 7/2010 | Miyamoto et al. | |
| 7,835,482 B2 | 11/2010 | Sato et al. | |
| 7,859,257 B2 | 12/2010 | Magnusson et al. | |
| 7,875,131 B2 | 1/2011 | Pandey | |
| 7,877,888 B2 | 2/2011 | Batzinger et al. | |
| 7,910,051 B2 | 3/2011 | Zimmermann et al. | |
| 7,967,055 B2 | 6/2011 | Parkos, Jr. et al. | |
| 8,002,912 B2 | 8/2011 | Pandey | |
| 8,020,509 B2 | 9/2011 | Calla et al. | |
| 8,021,715 B2 | 9/2011 | Jensen et al. | |
| 8,052,224 B2 | 11/2011 | Luo et al. | |
| 8,075,712 B2 | 12/2011 | Farmer | |
| 8,132,740 B2 | 3/2012 | Maev et al. | |
| 8,147,982 B2 | 4/2012 | Schlichting et al. | |
| 8,168,289 B2 | 5/2012 | Seth et al. | |
| 8,187,720 B2 | 5/2012 | Choi et al. | |
| 8,192,799 B2 | 6/2012 | Kay et al. | |
| 8,197,895 B2 | 6/2012 | Arndt et al. | |
| 8,231,936 B2 | 7/2012 | Song et al. | |
| 8,247,050 B2 | 8/2012 | McCrea et al. | |
| 8,252,376 B2 | 8/2012 | Buergel et al. | |
| 8,261,444 B2 | 9/2012 | Calla et al. | |
| 8,282,019 B2 | 10/2012 | Karimi Esfahani et al. | |
| 8,293,378 B2 | 10/2012 | Owen et al. | |
| 8,313,042 B2 | 11/2012 | Vanderzwet et al. | |
| 8,336,202 B2 | 12/2012 | Okamoto | |
| 8,343,573 B2 | 1/2013 | Jensen et al. | |
| 8,389,051 B2 | 3/2013 | Freudenberger et al. | |
| 8,389,059 B2 | 3/2013 | Kusinski et al. | |
| 8,389,066 B2 | 3/2013 | Vijay | |
| 8,389,126 B2 | 3/2013 | Kusinski et al. | |
| 8,394,473 B2 | 3/2013 | Mccrea et al. | |
| 8,486,249 B2 | 7/2013 | Almond et al. | |
| 8,491,959 B2 | 7/2013 | Miller et al. | |
| 8,505,806 B2 | 8/2013 | Totino et al. | |
| 8,524,053 B2 | 9/2013 | Farmer et al. | |
| 8,535,755 B2 | 9/2013 | Ajdelsztajn | |
| 8,536,860 B2 | 9/2013 | Boenisch | |
| 8,544,769 B2 | 10/2013 | Calla et al. | |
| 8,580,350 B2 | 11/2013 | Choi et al. | |
| 8,591,986 B1 | 11/2013 | Ajdelsztajn et al. | |
| 8,597,724 B2 | 12/2013 | Bunting et al. | |
| 8,601,663 B2 | 12/2013 | Ngo et al. | |
| 8,609,187 B1 | 12/2013 | Kang et al. | |
| 8,651,394 B2 | 2/2014 | Heinrich et al. | |
| 8,691,014 B2 | 4/2014 | Vijay | |
| 8,697,184 B2 | 4/2014 | Hertter et al. | |
| 8,699,654 B2 | 4/2014 | Magnusson et al. | |
| 8,703,234 B2 | 4/2014 | Song | |
| 8,728,572 B2 | 5/2014 | Berek et al. | |
| 8,737,557 B2 | 5/2014 | Pop et al. | |
| 8,739,404 B2 | 6/2014 | Bunker et al. | |
| 8,741,392 B2 | 6/2014 | McCrea et al. | |
| 8,778,459 B2 | 7/2014 | Farmer et al. | |
| 8,778,460 B2 | 7/2014 | Farmer | |
| 8,783,584 B2 | 7/2014 | Fukanuma | |
| 8,802,191 B2 | 8/2014 | Zimmermann et al. | |
| 8,883,250 B2 | 11/2014 | Miller et al. | |
| 8,916,248 B2 | 12/2014 | McCrea et al. | |
| 8,958,989 B2 | 2/2015 | Legendre et al. | |
| 8,971,476 B2 | 3/2015 | Mazzoccoli et al. | |
| 9,021,696 B2 | 5/2015 | Jakimov et al. | |
| 9,031,183 B2 | 5/2015 | Sato | |
| 9,040,116 B2 | 5/2015 | Jakimov et al. | |
| 9,067,282 B2 | 6/2015 | Sharp | |
| 9,095,858 B2 | 8/2015 | Fukanuma | |
| 9,096,035 B2 | 8/2015 | Sachdev et al. | |
| 9,109,291 B2 | 8/2015 | Lamberton et al. | |
| 9,138,838 B2 | 9/2015 | Calla et al. | |
| 9,140,130 B2 | 9/2015 | Mironets et al. | |
| 9,168,546 B2 | 10/2015 | Xue et al. | |
| 9,186,712 B1 | 11/2015 | Wright | |
| 9,260,784 B2 | 2/2016 | Jakimov et al. | |
| 9,273,400 B2 | 3/2016 | Nardi et al. | |
| 9,306,374 B2 | 4/2016 | Nakayama et al. | |
| 9,336,909 B2 | 5/2016 | Mazzoccoli et al. | |
| 9,337,002 B2 | 5/2016 | Daugherty et al. | |
| 9,347,136 B2 | 5/2016 | Verrier et al. | |
| 9,352,342 B2 | 5/2016 | Vlcek et al. | |
| 9,358,644 B2 | 6/2016 | Heinrichsdorff et al. | |
| 9,362,127 B2 | 6/2016 | Krenzer et al. | |
| 9,365,918 B2 | 6/2016 | Binder et al. | |
| 9,365,930 B1 | 6/2016 | Wright | |
| 9,377,287 B2 | 6/2016 | Tian et al. | |
| 9,394,063 B2 | 7/2016 | Jackson et al. | |
| 9,394,598 B2 | 7/2016 | Sato | |
| 9,460,818 B2 | 10/2016 | Bergman | |
| 9,472,311 B2 | 10/2016 | Pop et al. | |
| 9,481,933 B2 | 11/2016 | Mohanty | |
| 9,482,105 B1 | 11/2016 | Gorokhovsky et al. | |
| 9,546,432 B2 | 1/2017 | Shih et al. | |
| 9,555,473 B2 | 1/2017 | Slattery | |
| 9,562,280 B2 | 2/2017 | Suhonen et al. | |
| 9,580,787 B2 | 2/2017 | Hofener et al. | |
| 9,593,930 B2 | 3/2017 | Lakhan et al. | |
| 9,598,774 B2 | 3/2017 | Ajdelsztajn et al. | |
| 9,599,210 B2 | 3/2017 | Hansen et al. | |
| 9,611,562 B2 | 4/2017 | Lancaster-Larocque et al. | |
| 9,611,803 B2 | 4/2017 | Vieira De Morais et al. | |
| 9,640,285 B2 | 5/2017 | Shin et al. | |
| 9,644,662 B2 | 5/2017 | Williamson | |
| 9,657,682 B2 | 5/2017 | Graham et al. | |
| 9,663,870 B2 | 5/2017 | Sun et al. | |
| 9,695,489 B1 | 7/2017 | Wright | |
| 9,758,875 B2 | 9/2017 | Verrier et al. | |
| 9,765,436 B2 | 9/2017 | Kennedy et al. | |
| 9,765,635 B2 | 9/2017 | Gorokhovsky | |
| 9,783,882 B2 | 10/2017 | Miller et al. | |

(56) References Cited

U.S. PATENT DOCUMENTS

| | | |
|---|---|---|
| 9,790,375 B2 | 10/2017 | Xu et al. |
| 9,790,889 B2 | 10/2017 | Beerens et al. |
| 9,857,171 B2 | 1/2018 | Fischer |
| 9,879,348 B2 | 1/2018 | Sun et al. |
| 9,892,824 B2 | 2/2018 | Perego et al. |
| 9,911,511 B2 | 3/2018 | Ledford et al. |
| 9,938,834 B2 | 4/2018 | Blumer et al. |
| 9,995,178 B2 | 6/2018 | Schurhoff |
| 10,008,295 B2 | 6/2018 | Sato |
| 10,017,844 B2 | 7/2018 | Detor et al. |
| 10,077,499 B2 | 9/2018 | Sullivan et al. |
| 10,093,434 B2 | 10/2018 | Matthews et al. |
| 10,099,322 B2 | 10/2018 | Widener et al. |
| 10,100,412 B2 | 10/2018 | Nardi et al. |
| 10,119,195 B2 | 11/2018 | Mohanty et al. |
| 10,155,236 B2 | 12/2018 | Tan et al. |
| 10,161,048 B2 | 12/2018 | Kennedy et al. |
| 10,167,727 B2 | 1/2019 | Vargas et al. |
| 10,179,951 B2 | 1/2019 | Nardi et al. |
| 10,211,126 B2 | 2/2019 | Hamweendo et al. |
| 10,226,791 B2 | 3/2019 | Dardas et al. |
| 10,229,761 B2 | 3/2019 | Whittaker et al. |
| 10,273,822 B2 | 4/2019 | Strock et al. |
| 10,295,502 B2 | 5/2019 | Clavette et al. |
| 10,300,445 B2 | 5/2019 | Maev et al. |
| 10,301,950 B2 | 5/2019 | Garosshen |
| 10,311,985 B2 | 6/2019 | Thinguldstad et al. |
| 10,315,218 B2 | 6/2019 | Mahalingam et al. |
| 10,329,033 B2 | 6/2019 | Choi et al. |
| 10,329,432 B2 | 6/2019 | Magdefrau et al. |
| 10,395,784 B2 | 8/2019 | Ginsberg et al. |
| 10,438,707 B2 | 10/2019 | Kito et al. |
| 10,441,962 B2 | 10/2019 | Widener et al. |
| 10,443,132 B1 | 10/2019 | El-Eskandarany et al. |
| 10,475,723 B1 | 11/2019 | Yeh et al. |
| 10,501,827 B2 | 12/2019 | Champagne, Jr. et al. |
| 10,533,818 B1 | 1/2020 | Champagne et al. |
| 10,596,629 B2 | 3/2020 | Slattery |
| 10,597,784 B2 | 3/2020 | McGee et al. |
| 10,598,186 B2 | 3/2020 | Cappuccini et al. |
| 10,626,489 B2 | 4/2020 | Grensing et al. |
| 10,633,719 B1 | 4/2020 | Wright |
| 10,648,085 B2 | 5/2020 | Reznik et al. |
| 10,677,340 B2 | 6/2020 | Hansen et al. |
| 10,702,939 B2 | 7/2020 | Binek et al. |
| 10,714,671 B2 | 7/2020 | Thuss |
| 10,746,524 B2 | 8/2020 | Qi |
| 10,808,323 B2 | 10/2020 | Nardi et al. |
| 2004/0037954 A1 | 2/2004 | Heinrich et al. |
| 2004/0126499 A1 | 7/2004 | Heinrich et al. |
| 2005/0016489 A1 | 1/2005 | Endicott et al. |
| 2005/0105669 A1 | 5/2005 | Roche et al. |
| 2005/0118485 A1 | 6/2005 | Tawfik et al. |
| 2006/0027687 A1 | 2/2006 | Heinrich et al. |
| 2006/0088755 A1 | 4/2006 | Tawfik et al. |
| 2006/0090593 A1 | 5/2006 | Liu |
| 2006/0093736 A1 | 5/2006 | Raybould et al. |
| 2006/0121183 A1 | 6/2006 | DeBiccari et al. |
| 2006/0121187 A1 | 6/2006 | Haynes et al. |
| 2006/0134320 A1 | 6/2006 | DeBiccari et al. |
| 2006/0134321 A1 | 6/2006 | DeBiccari et al. |
| 2006/0219329 A1 | 10/2006 | Hu et al. |
| 2006/0219330 A1 | 10/2006 | Hu et al. |
| 2006/0222776 A1 | 10/2006 | Madhava et al. |
| 2007/0031591 A1 | 2/2007 | Junker et al. |
| 2007/0076835 A1 | 4/2007 | Tobimatsu et al. |
| 2007/0098912 A1 | 5/2007 | Raybould et al. |
| 2007/0099014 A1 | 5/2007 | McCullough et al. |
| 2007/0278324 A1 | 12/2007 | Gartner et al. |
| 2008/0047222 A1 | 2/2008 | Barnes |
| 2008/0277458 A1 | 11/2008 | Kocak et al. |
| 2009/0061184 A1 | 3/2009 | Jaworowski et al. |
| 2009/0130327 A1 | 5/2009 | Erdmann et al. |
| 2009/0148622 A1 | 6/2009 | Stoltenhoff et al. |
| 2009/0256010 A1 | 10/2009 | Golna et al. |
| 2010/0015467 A1 | 1/2010 | Zimmermann et al. |
| 2010/0028706 A1 | 2/2010 | Hornschu et al. |
| 2010/0102808 A1 | 4/2010 | Boenisch |
| 2010/0119707 A1 | 5/2010 | Raybould et al. |
| 2010/0143700 A1 | 6/2010 | Champagne et al. |
| 2010/0155251 A1 | 6/2010 | Bogue et al. |
| 2010/0181391 A1 | 7/2010 | Gärtner et al. |
| 2010/0272982 A1 | 10/2010 | Dickinson et al. |
| 2010/0288848 A1 | 11/2010 | Kamei |
| 2011/0003165 A1 | 1/2011 | Weber |
| 2011/0014055 A1 | 1/2011 | Hertter et al. |
| 2011/0020665 A1 | 1/2011 | Serafin et al. |
| 2011/0094439 A1 | 4/2011 | Stier |
| 2011/0129351 A1 | 6/2011 | Das et al. |
| 2011/0129600 A1 | 6/2011 | Das et al. |
| 2011/0174207 A1 | 7/2011 | Harrick et al. |
| 2011/0197953 A1 | 8/2011 | Pfeuffer |
| 2011/0314791 A1 | 12/2011 | Haynes et al. |
| 2011/0318497 A1 | 12/2011 | Beals et al. |
| 2012/0097322 A1 | 4/2012 | Pyritz et al. |
| 2012/0114868 A1 | 5/2012 | Bunker et al. |
| 2012/0177908 A1 | 7/2012 | Petorak et al. |
| 2012/0196151 A1 | 8/2012 | Schlichting et al. |
| 2012/0294409 A1 | 11/2012 | Yanagisawa et al. |
| 2013/0034661 A1 | 2/2013 | Schneiderbanger et al. |
| 2013/0047394 A1 | 2/2013 | Cretegny et al. |
| 2013/0087633 A1 | 4/2013 | Fukanuma |
| 2013/0177437 A1 | 7/2013 | Amancherla et al. |
| 2014/0039830 A1 | 2/2014 | Huang |
| 2014/0057132 A1 | 2/2014 | Totino et al. |
| 2014/0069700 A1 | 3/2014 | Hirano et al. |
| 2014/0099494 A1 | 4/2014 | Choi et al. |
| 2014/0109861 A1 | 4/2014 | Korner et al. |
| 2014/0127400 A1 | 5/2014 | Zanon et al. |
| 2014/0230692 A1 | 8/2014 | Hofener et al. |
| 2014/0251255 A1 | 9/2014 | Beerens et al. |
| 2014/0272166 A1 | 9/2014 | Shim et al. |
| 2014/0315392 A1 | 10/2014 | Xu et al. |
| 2014/0342094 A1 | 11/2014 | Hofener et al. |
| 2015/0118485 A1 | 4/2015 | Wang et al. |
| 2015/0225301 A1 | 8/2015 | Schulz et al. |
| 2015/0247245 A1 | 9/2015 | Wali |
| 2015/0299863 A1 | 10/2015 | Champagne et al. |
| 2015/0321217 A1 | 11/2015 | Nardi et al. |
| 2015/0354376 A1 | 12/2015 | Garosshen |
| 2016/0024942 A1 | 1/2016 | Faughnan, Jr. et al. |
| 2016/0047052 A1 | 2/2016 | Baranovski et al. |
| 2016/0053380 A1 | 2/2016 | Klecka et al. |
| 2016/0076984 A1* | 3/2016 | Nick .................. G01N 3/24 73/842 |
| 2016/0090653 A1 | 3/2016 | Jensen et al. |
| 2016/0115797 A1 | 4/2016 | Calla et al. |
| 2016/0122557 A1 | 5/2016 | Magdefrau et al. |
| 2016/0168721 A1 | 6/2016 | Nardi et al. |
| 2016/0221014 A1 | 8/2016 | Nardi et al. |
| 2016/0245110 A1 | 8/2016 | Strock et al. |
| 2016/0251975 A1 | 9/2016 | Strock et al. |
| 2016/0273387 A1 | 9/2016 | Goepfert |
| 2016/0297039 A1 | 10/2016 | Simpson et al. |
| 2016/0319417 A1 | 11/2016 | Boileau et al. |
| 2016/0334049 A1 | 11/2016 | Weber |
| 2016/0340060 A1 | 11/2016 | Matthews et al. |
| 2016/0375451 A1 | 12/2016 | Hoiland et al. |
| 2017/0025195 A1 | 1/2017 | Fernandez |
| 2017/0029959 A1 | 2/2017 | Lu et al. |
| 2017/0038342 A1 | 2/2017 | Clavette et al. |
| 2017/0057023 A1 | 3/2017 | Sharp et al. |
| 2017/0098482 A1 | 4/2017 | Yoshida |
| 2017/0114438 A1 | 4/2017 | Allcock |
| 2017/0130733 A1 | 5/2017 | Cappuccini et al. |
| 2017/0137949 A1 | 5/2017 | Bahraini Hasani et al. |
| 2017/0173611 A1 | 6/2017 | Tan et al. |
| 2017/0253977 A1 | 9/2017 | Champagne et al. |
| 2017/0333934 A1 | 11/2017 | Le Do |
| 2017/0369187 A1 | 12/2017 | Choi et al. |
| 2018/0025794 A1 | 1/2018 | Lahoda et al. |
| 2018/0042119 A1 | 2/2018 | Dantin et al. |
| 2018/0050391 A1 | 2/2018 | Maev et al. |
| 2018/0096743 A1 | 4/2018 | Lahoda et al. |

(56) References Cited

U.S. PATENT DOCUMENTS

| | | |
|---|---|---|
| 2018/0163548 A1 | 6/2018 | Srinivasan et al. |
| 2018/0180125 A1 | 6/2018 | Hollis |
| 2018/0190395 A1 | 7/2018 | Clarkson et al. |
| 2018/0200755 A1 | 7/2018 | Dardas et al. |
| 2018/0223870 A1 | 8/2018 | Parthasarathy et al. |
| 2018/0240558 A1 | 8/2018 | Sato et al. |
| 2018/0245194 A1 | 8/2018 | Detor et al. |
| 2018/0254110 A1 | 9/2018 | Ledford et al. |
| 2018/0254114 A1 | 9/2018 | Lahoda |
| 2018/0258539 A1 | 9/2018 | Wilson et al. |
| 2018/0274104 A1 | 9/2018 | Reznik et al. |
| 2018/0281317 A1 | 10/2018 | Gulizia et al. |
| 2018/0312976 A1 | 11/2018 | Wiley et al. |
| 2018/0327912 A1 | 11/2018 | Sullivan et al. |
| 2018/0355487 A1 | 12/2018 | Hirano |
| 2018/0361708 A1 | 12/2018 | Hirano |
| 2019/0010612 A1 | 1/2019 | Nardi et al. |
| 2019/0024241 A1 | 1/2019 | McGee et al. |
| 2019/0024242 A1 | 1/2019 | Binek et al. |
| 2019/0056356 A1 | 2/2019 | Le et al. |
| 2019/0085431 A1 | 3/2019 | Rios et al. |
| 2019/0094643 A1 | 3/2019 | Friedman et al. |
| 2019/0106996 A1 | 4/2019 | Vargas et al. |
| 2019/0137375 A1 | 5/2019 | Belter |
| 2019/0164658 A1 | 5/2019 | Mazzoccoli et al. |
| 2019/0184417 A1 | 6/2019 | Binek et al. |
| 2019/0194817 A1 | 6/2019 | Sun et al. |
| 2019/0233946 A1 | 8/2019 | Bruton et al. |
| 2019/0235477 A1 | 8/2019 | Widener et al. |
| 2019/0264318 A1 | 8/2019 | Ke et al. |
| 2019/0308266 A1 | 10/2019 | Binek et al. |
| 2019/0329374 A1 | 10/2019 | Zhang et al. |
| 2019/0329906 A1 | 10/2019 | Cawthorne et al. |
| 2019/0330742 A1 | 10/2019 | Wu et al. |
| 2019/0337054 A1 | 11/2019 | Dardona et al. |
| 2019/0366365 A1 | 12/2019 | Binek et al. |
| 2019/0366362 A1 | 12/2019 | Binek et al. |
| 2019/0366363 A1 | 12/2019 | Binek et al. |
| 2019/0381525 A1 | 12/2019 | Widener et al. |
| 2020/0009657 A1 | 1/2020 | Teng et al. |
| 2020/0020455 A1 | 1/2020 | Lahoda |
| 2020/0023390 A1 | 1/2020 | Watkins et al. |
| 2020/0027591 A1 | 1/2020 | Wittaker et al. |
| 2020/0027595 A1 | 1/2020 | Thinguldstad et al. |
| 2020/0040201 A1 | 2/2020 | Song |
| 2020/0048761 A1 | 2/2020 | Kim et al. |
| 2020/0056277 A1 | 2/2020 | Kim et al. |
| 2020/0096308 A1 | 3/2020 | Hughes et al. |
| 2020/0102782 A1 | 4/2020 | Ortuzar et al. |
| 2020/0108405 A1 | 4/2020 | Fukanuma |
| 2020/0109465 A1 | 4/2020 | Cao et al. |
| 2020/0131644 A1 | 4/2020 | von Schleinitz |
| 2020/0157689 A1 | 5/2020 | Mccall et al. |
| 2020/0161010 A1 | 5/2020 | Lahoda et al. |
| 2020/0163397 A1 | 5/2020 | Ganor |
| 2020/0194334 A1 | 6/2020 | Robinson et al. |
| 2020/0215559 A1 | 7/2020 | Fukanuma |
| 2020/0216965 A1 | 7/2020 | Marinescu et al. |
| 2020/0227312 A1 | 7/2020 | Escher-Poeppel et al. |
| 2020/0232084 A1 | 7/2020 | Grensing et al. |
| 2020/0238375 A1 | 7/2020 | Poirier et al. |
| 2020/0240004 A1 | 7/2020 | Kim et al. |
| 2020/0247056 A1 | 8/2020 | Binek et al. |
| 2020/0278160 A1 | 9/2020 | Chipko et al. |
| 2020/0300094 A1 | 9/2020 | Mega et al. |
| 2020/0303614 A1 | 9/2020 | Thuss |
| 2020/0331064 A1 | 10/2020 | Sherman |
| 2020/0346401 A1 | 11/2020 | Brown et al. |
| 2020/0362462 A1 | 11/2020 | Braley et al. |
| 2020/0376507 A1 | 12/2020 | Ozdemir |
| 2020/0385842 A1 | 12/2020 | Sherman et al. |
| 2020/0391284 A1 | 12/2020 | Schepak et al. |
| 2022/0074055 A1 | 3/2022 | Braley et al. |

FOREIGN PATENT DOCUMENTS

| | | |
|---|---|---|
| EP | 1382719 A2 | 1/2004 |
| EP | 1092497 B1 | 4/2004 |
| EP | 1477579 A1 | 11/2004 |
| EP | 1558400 A1 | 8/2005 |
| EP | 1227296 B1 | 9/2005 |
| EP | 1393013 B1 | 9/2005 |
| EP | 1588445 A1 | 10/2005 |
| EP | 1462546 B1 | 5/2006 |
| EP | 1666635 A1 | 6/2006 |
| EP | 1666636 A1 | 6/2006 |
| EP | 1674594 A1 | 6/2006 |
| EP | 1593437 B1 | 10/2006 |
| EP | 1215493 B1 | 2/2007 |
| EP | 1382720 B1 | 2/2007 |
| EP | 1785503 A2 | 5/2007 |
| EP | 1806183 A1 | 7/2007 |
| EP | 1390152 B1 | 9/2007 |
| EP | 1829988 A1 | 9/2007 |
| EP | 1831426 A1 | 9/2007 |
| EP | 1854547 A1 | 11/2007 |
| EP | 1791645 B1 | 12/2007 |
| EP | 1878813 A1 | 1/2008 |
| EP | 1880035 A1 | 1/2008 |
| EP | 1880036 A2 | 1/2008 |
| EP | 1880038 A1 | 1/2008 |
| EP | 1902785 A1 | 3/2008 |
| EP | 1903126 A1 | 3/2008 |
| EP | 1903127 A1 | 3/2008 |
| EP | 1806429 B1 | 7/2008 |
| EP | 1966408 A2 | 9/2008 |
| EP | 1990444 A2 | 11/2008 |
| EP | 1904666 B1 | 12/2008 |
| EP | 2014794 A1 | 1/2009 |
| EP | 2014795 A1 | 1/2009 |
| EP | 1652601 B1 | 2/2009 |
| EP | 1700638 B1 | 3/2009 |
| EP | 1857183 B1 | 7/2009 |
| EP | 2102380 A2 | 9/2009 |
| EP | 2110178 A1 | 10/2009 |
| EP | 2113135 A2 | 11/2009 |
| EP | 2127759 A1 | 12/2009 |
| EP | 2154264 A1 | 2/2010 |
| EP | 2155419 A2 | 2/2010 |
| EP | 2027305 B1 | 5/2010 |
| EP | 2204473 A2 | 7/2010 |
| EP | 2206803 A1 | 7/2010 |
| EP | 1472701 B1 | 8/2010 |
| EP | 1578540 B1 | 1/2011 |
| EP | 1674595 B1 | 2/2011 |
| EP | 1816235 B1 | 3/2011 |
| EP | 2327812 A1 | 6/2011 |
| EP | 1817601 B1 | 7/2011 |
| EP | 2347447 A1 | 7/2011 |
| EP | 2348078 A1 | 7/2011 |
| EP | 2011964 B1 | 8/2011 |
| EP | 2350334 A2 | 8/2011 |
| EP | 2112241 B1 | 9/2011 |
| EP | 2365315 A2 | 9/2011 |
| EP | 2422051 A2 | 2/2012 |
| EP | 2425032 A2 | 3/2012 |
| EP | 2438204 A1 | 4/2012 |
| EP | 2448709 A1 | 5/2012 |
| EP | 1925693 B1 | 6/2012 |
| EP | 2462257 A1 | 6/2012 |
| EP | 1685923 B1 | 7/2012 |
| EP | 2260119 B1 | 8/2012 |
| EP | 2188416 B1 | 9/2012 |
| EP | 2499278 A1 | 9/2012 |
| EP | 1506816 B1 | 1/2013 |
| EP | 2551023 A2 | 1/2013 |
| EP | 2564980 A2 | 3/2013 |
| EP | 2578337 A1 | 4/2013 |
| EP | 1971443 B1 | 5/2013 |
| EP | 2593575 A1 | 5/2013 |
| EP | 2598869 A1 | 6/2013 |
| EP | 2283487 B1 | 7/2013 |
| EP | 2612948 A2 | 7/2013 |

(56) References Cited

FOREIGN PATENT DOCUMENTS

| | | |
|---|---|---|
| EP | 2618070 A1 | 7/2013 |
| EP | 2623730 A1 | 8/2013 |
| EP | 2690195 A1 | 1/2014 |
| EP | 2691554 A1 | 2/2014 |
| EP | 2706129 A1 | 3/2014 |
| EP | 2108051 B1 | 4/2014 |
| EP | 2298962 B1 | 6/2014 |
| EP | 2737102 A2 | 6/2014 |
| EP | 2104753 B1 | 7/2014 |
| EP | 2766124 A1 | 8/2014 |
| EP | 2769073 A1 | 8/2014 |
| EP | 2560789 B1 | 10/2014 |
| EP | 2108120 B1 | 11/2014 |
| EP | 2205932 B1 | 3/2015 |
| EP | 2377967 B1 | 3/2015 |
| EP | 2688708 B1 | 8/2015 |
| EP | 2902530 A1 | 8/2015 |
| EP | 2783078 B1 | 10/2015 |
| EP | 2971247 A1 | 1/2016 |
| EP | 2981380 A1 | 2/2016 |
| EP | 2996814 A1 | 3/2016 |
| EP | 2778256 B1 | 4/2016 |
| EP | 1844181 B1 | 5/2016 |
| EP | 2072634 B1 | 5/2016 |
| EP | 2044594 B1 | 7/2016 |
| EP | 2835635 B1 | 7/2016 |
| EP | 2175050 B1 | 9/2016 |
| EP | 3069821 A2 | 9/2016 |
| EP | 2381218 B1 | 10/2016 |
| EP | 2974796 B1 | 5/2017 |
| EP | 3181237 A1 | 6/2017 |
| EP | 2657368 B1 | 8/2017 |
| EP | 2569460 B1 | 9/2017 |
| EP | 3218529 A2 | 9/2017 |
| EP | 2885125 B1 | 11/2017 |
| EP | 3241416 A1 | 11/2017 |
| EP | 2808643 B1 | 1/2018 |
| EP | 2859133 B1 | 1/2018 |
| EP | 3069354 B1 | 1/2018 |
| EP | 3275637 A1 | 1/2018 |
| EP | 2506981 B1 | 2/2018 |
| EP | 2626166 B1 | 3/2018 |
| EP | 3143286 B1 | 4/2018 |
| EP | 2179426 B1 | 5/2018 |
| EP | 3314037 A1 | 5/2018 |
| EP | 3017874 B1 | 7/2018 |
| EP | 2806049 B1 | 8/2018 |
| EP | 3088105 B1 | 8/2018 |
| EP | 2992123 B1 | 10/2018 |
| EP | 3049551 B1 | 10/2018 |
| EP | 3128321 B1 | 10/2018 |
| EP | 2732072 B1 | 11/2018 |
| EP | 2737101 B1 | 11/2018 |
| EP | 3230492 B1 | 11/2018 |
| EP | 2737100 B1 | 12/2018 |
| EP | 2917918 B1 | 12/2018 |
| EP | 3155138 B1 | 12/2018 |
| EP | 3412796 A1 | 12/2018 |
| EP | 3095711 B1 | 1/2019 |
| EP | 3431186 A1 | 1/2019 |
| EP | 3431630 A1 | 1/2019 |
| EP | 2604723 B1 | 2/2019 |
| EP | 1999297 B1 | 3/2019 |
| EP | 3451376 A1 | 3/2019 |
| EP | 2110450 B1 | 5/2019 |
| EP | 2985424 B1 | 5/2019 |
| EP | 3488026 A1 | 5/2019 |
| EP | 2229241 B1 | 6/2019 |
| EP | 2921573 B1 | 6/2019 |
| EP | 3520116 A2 | 8/2019 |
| EP | 3525559 A1 | 8/2019 |
| EP | 3526369 A1 | 8/2019 |
| EP | 2884604 B1 | 10/2019 |
| EP | 3049189 B1 | 10/2019 |
| EP | 3546091 A1 | 10/2019 |
| EP | 3549713 A1 | 10/2019 |
| EP | 3572623 A1 | 11/2019 |
| EP | 3577321 A1 | 12/2019 |
| EP | 3578684 A1 | 12/2019 |
| EP | 3578689 A1 | 12/2019 |
| EP | 3578690 A1 | 12/2019 |
| EP | 3055445 B1 | 1/2020 |
| EP | 3168323 B1 | 1/2020 |
| EP | 3593358 A1 | 1/2020 |
| EP | 3604456 A1 | 2/2020 |
| EP | 3608441 A1 | 2/2020 |
| EP | 3631135 A1 | 4/2020 |
| EP | 3642377 A1 | 4/2020 |
| EP | 3008227 B1 | 5/2020 |
| EP | 3066232 B1 | 5/2020 |
| EP | 3647615 A1 | 5/2020 |
| EP | 3649272 A1 | 5/2020 |
| EP | 3649273 A1 | 5/2020 |
| EP | 3650581 A1 | 5/2020 |
| EP | 3655182 A1 | 5/2020 |
| EP | 3396021 B1 | 7/2020 |
| EP | 3677702 A1 | 7/2020 |
| EP | 3679602 A1 | 7/2020 |
| EP | 3689510 A1 | 8/2020 |
| EP | 3181727 B1 | 9/2020 |
| EP | 3066233 B1 | 11/2020 |
| EP | 3348670 B1 | 11/2020 |
| EP | 3733933 A1 | 11/2020 |
| EP | 3739082 A1 | 11/2020 |
| EP | 3245007 B1 | 12/2020 |
| EP | 3746581 A1 | 12/2020 |
| JP | 2010129934 A | 6/2010 |
| JP | 2012172207 A | 9/2012 |
| WO | WO-2013142902 A2 * | 10/2013 ............... B05D 1/02 |
| WO | 2021055284 A1 | 3/2021 |

OTHER PUBLICATIONS

Singh et al., Effect of electroplated interlayers on properties of cold-sprayed copper coatings on SS316L steel, Surface & Coatings Technology (Jul. 8, 2019), 375:54-65.

Singh et al., Influence of coating thickness on residual stress and adhesion-strength of cold-sprayed Inconel 718 coatings. Surface & Coatings Technology (Jun. 28, 2018), 350:64-73.

Garcia-Rodriguez et al., Characterization and mechanical properties of stainless steel coatings deposited by HVOF on ZE41 magnesium alloy (Dec. 14, 2018), 359:73-84.

* cited by examiner

_____

APPARATUS FOR PERFORMING IN-SITU ADHESION TEST OF COLD SPRAY DEPOSITS AND METHOD OF EMPLOYING

CROSS-REFERENCE TO RELATED APPLICATIONS

This application is a U.S. National Stage Entry under 35 U.S.C. § 371 of International Patent Application No. PCT/US2020/050719, entitled APPARATUS FOR PERFORMING IN-SITU ADHESION TEST OF COLD SPRAY DEPOSITS AND METHOD OF EMPLOYING, filed Sep. 14, 2020, which claims the benefit under 35 U.S.C. § 119 (e) to U.S. Provisional Application Ser. No. 62/902,553, filed Sep. 19, 2019, the contents of which is incorporated herein by reference in their entirety.

BACKGROUND

1. Field

The present invention relates to apparatus for performing in-situ adhesion tests of cold spray deposits. The present invention also relates to methods for using such apparatus while performing in-situ adhesion tests of cold spray deposits.

2. Related Art

Cold spray is a method of depositing metals and metal/ceramic blends on a surface by accelerating powder particles through a short de Laval type nozzle using a high temperature/pressure gas source. Cold spray is being considered for repair of large structures (such as spent fuel canisters or piping) installed in locations where access may be confined to a small gap or annulus. Such structures may have been in service for extended periods of time, with the results being deposits of oxide or other detrimental debris on the surface. The bond strength of the cold spray deposits to the substrate can be detrimentally affected by such surface deposits, and by limited standoff distances which may necessitate suboptimal nozzle sizes and positioning during deposition. Therefore, a method for verifying the quality of a cold spray deposit made on such an in-service structure (or under 'field conditions') would be desirable.

The lug shear test is one method to quantify the bond quality between a deposit and a substrate. The shear stress inherently accounts for the metallurgical quality of the deposit at the substrate/deposit interface (porosity and cohesion) and the condition of the substrate's surface (oxidation, debris). Therefore, the ability to test the bond strength of a cold spray deposit in situ by measuring the shear force required to dislodge the deposit from the surface being repaired would provide a means to assure the quality of a cold spray deposit as a mitigation or repair technique for field applications.

SUMMARY

As one aspect of the present invention a testing arrangement fix performing an in-situ adhesion test of a cold spray deposit on a surface of a structure is provided. The testing arrangement comprises: a specimen member comprising a number of apertures defined therein; and a loading arrangement coupled to the specimen member, the loading arrangement being configured to provide a mechanical force of a known magnitude to the specimen member.

The number of apertures may comprise a single rectangular shaped aperture. The specimen member may comprise a flat rectangular bar. The number of apertures may comprise a plurality of apertures. The plurality of apertures may be arranged in a predetermined pattern. The specimen member may comprise a connecting portion engaged by a correspondingly shaped connecting portion of the loading arrangement. The specimen member may comprise a connecting portion engaged by a correspondingly shaped connecting portion of the loading arrangement, wherein the connecting portion of the specimen member comprises a raised portion having a loading face that extends upward from the rectangular bar. The loading arrangement may comprise a mechanical actuator that provides the mechanical force and a load cell that determines the mechanical force provided by the mechanical actuator. The loading arrangement may comprise a number of roller members structured to engage the surface of the structure. The loading arrangement may comprise a number of spring-loaded roller guides structured to engage another surface of the structure disposed opposite the surface of the structure.

As another aspect of the invention, a method of performing an in-situ adhesion test of a cold spray deposit on a structure is provided. The method comprises: positioning a testing arrangement such as previously described with respect to a surface of the structure; depositing the cold spray deposit on the surface of the structure; and testing the adhesion of the cold spray deposit to the surface.

Depositing the cold spray deposit on the surface of the structure may comprise providing a quantity of a cold spray material through the number of apertures and onto the surface. Providing a quantity of a cold spray material through the number of apertures and onto the surface may comprise spraying the quantity of the cold spray material. Testing the adhesion of the deposit to the surface may comprise: determining the number of apertures are filled to a predetermined level prior to carrying out the testing; and applying a known mechanical force to the test specimen until the cold spray deposit is unbonded from the surface.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

A further understanding of the invention can be gained from the following description of the preferred embodiments when read in conjunction with the accompanying drawings in which.

DETAILED DESCRIPTION

Figure 1:
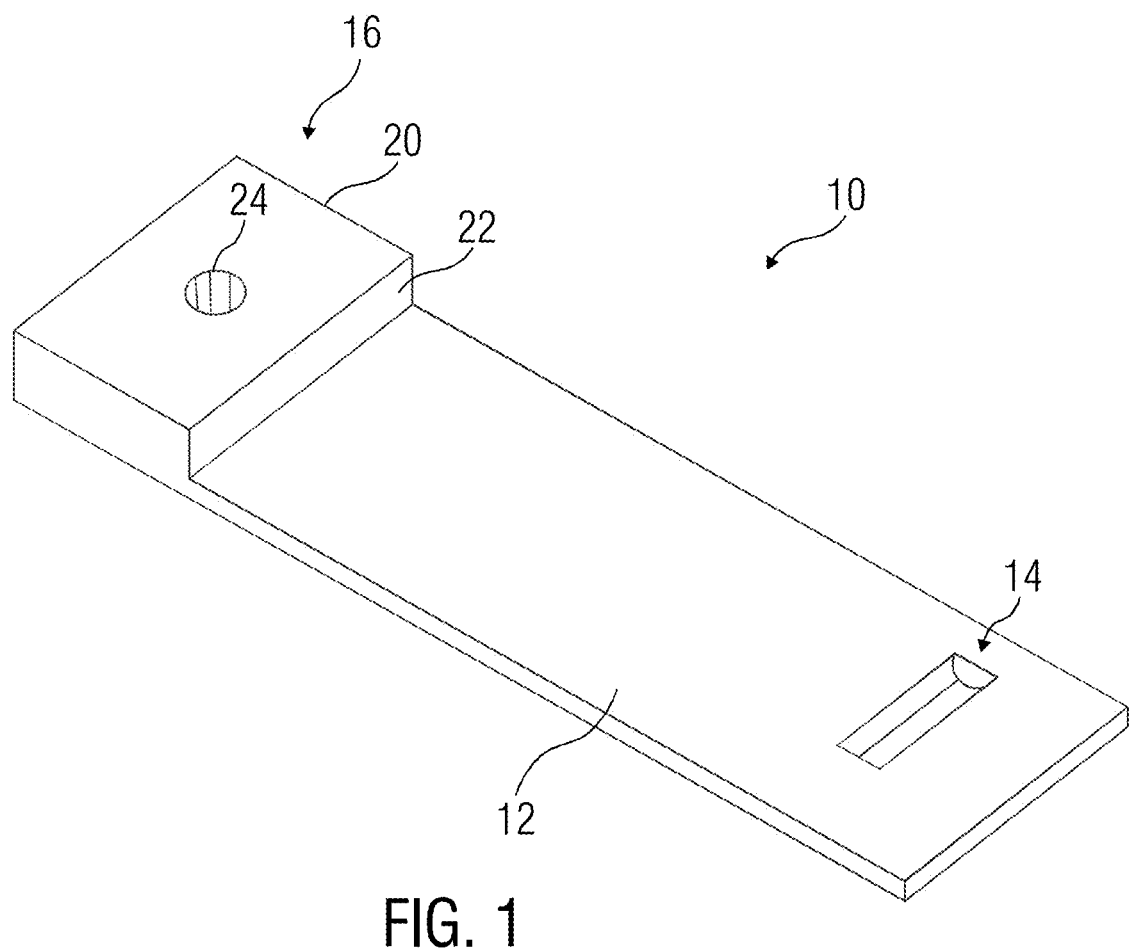
FIG. 1 is an isometric view of a specimen member in accordance with one example embodiment of the present invention.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms. As used herein, the term "number" shall be used to refer to any non-zero integer quantity, i.e., one or any integer greater than one (e.g., 1, 2, 3, . . . ).

Figure 2:
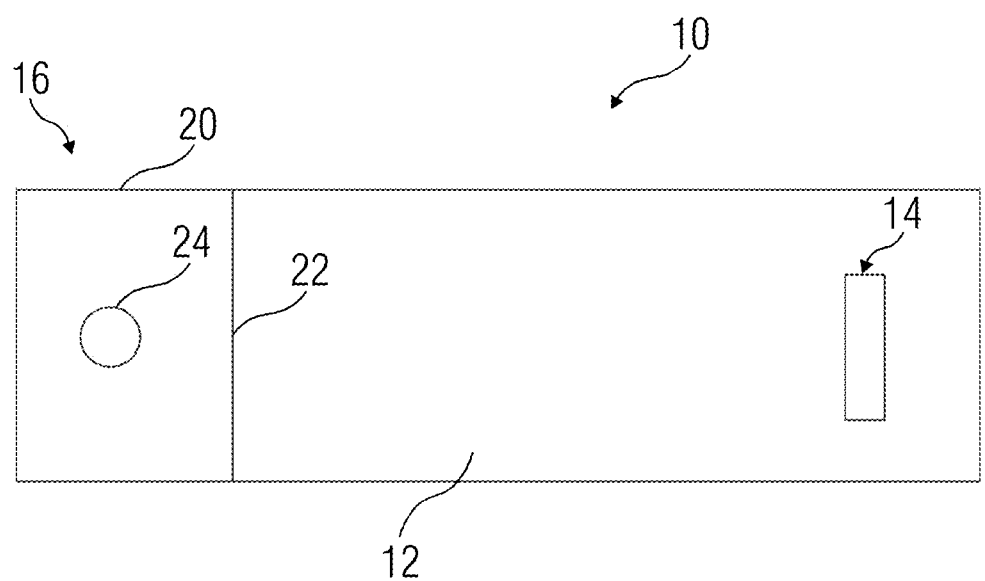
FIG. 2 is a top view of the specimen member of FIG. 1.

A specimen member 10 in accordance with one example embodiment of the present invention is depicted in FIGS. 1 and 2. Specimen member 10 may be of many different shapes, with the simplest being a flat rectangular bar 12, such as shown in FIGS. 1 and 2. Specimen member 10 includes a number of apertures 14 defined therein through which a quantity of a cold spray deposit applied to specimen member 10 will contact the surface of an underlying structure on which specimen member 10 is positioned, in the example shown in FIGS. 1 and 2, specimen member 10 includes only a single rectangular shaped aperture 14, however, it is to be appreciated that one or more of the quantity, shape, pattern, size, cross-sectional wall shape, etc., of aperture(s) 14 may be varied without varying from the scope of the present invention.

Continuing to refer to FIGS. 1 and 2, specimen member 10 further includes a connecting portion 16 for connecting specimen member 10 to a loading arrangement 18, such as discussed in conjunction with FIGS. 3-7 below. In the example shown in FIGS. 1 and 2, connecting portion 16 includes a raised portion 20 having a loading face 22 that extends upward from rectangular bar 12. Raised portion may be formed integrally with rectangular bar 12 or as a separate member coupled to rectangular bar 12 via, any suitable arrangement. Such arrangement of raised portion 20 and loading face 22 provides for a "shoulder-loading" of specimen member 10 by loading arrangement 18 as discussed further below. Raised portion 20 may further include a threaded aperture 24 defined therein for use in securing loading arrangement 18 to specimen member 10.

Specimen member 10 may be formed from any suitable material. In one example embodiment, specimen member 10 has been formed from tool steel to increase longevity and reduce bonding of the cold sprayed particles on specimen member 10.

Figure 3:
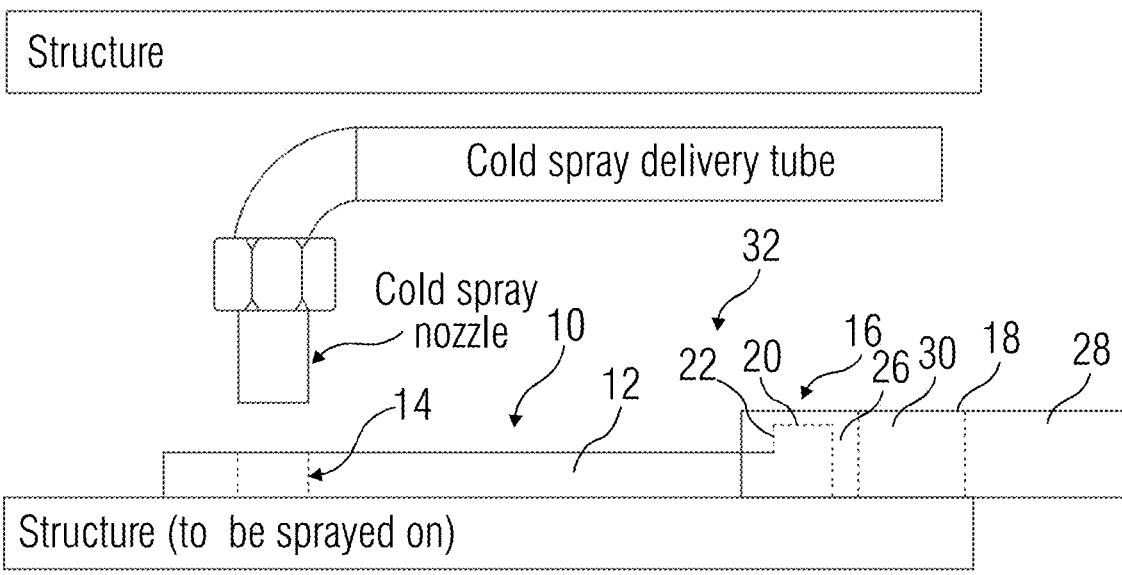
FIG. 3 is a schematic view of a testing arrangement for performing an in-situ adhesion test of a cold spray deposit in accordance with one example embodiment of the present invention shown positioned with respect to a structure to be coated prior to applying a coating to the specimen member of the arrangement.
Figure 4:
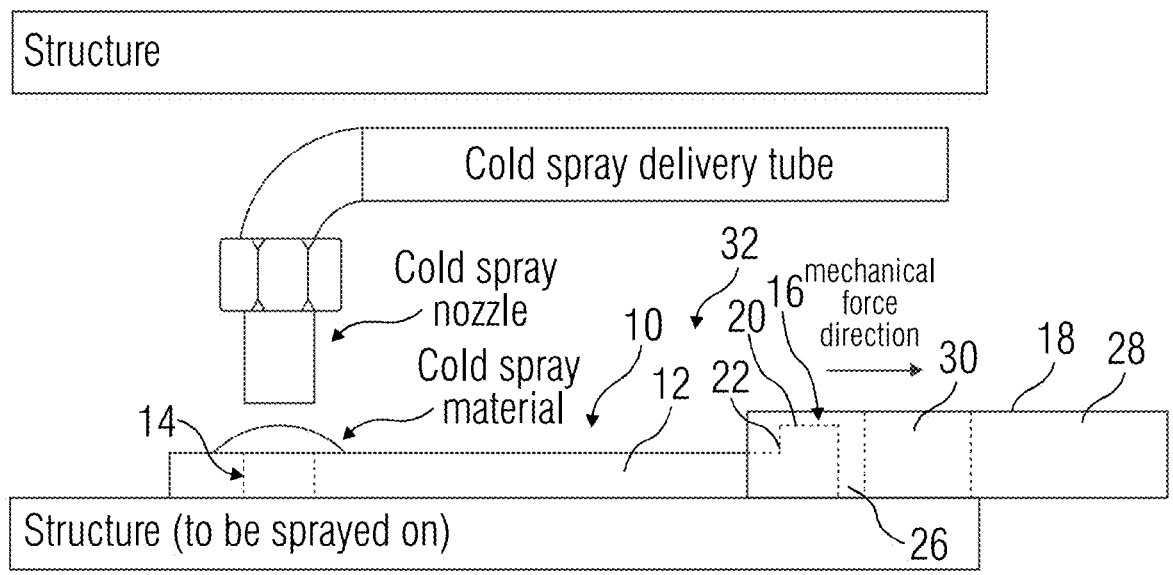
FIG. 4 is another schematic view of the testing arrangement of FIG. 3 shown with the coating applied to the specimen member and a mechanical force applied to the specimen.
Figure 5:
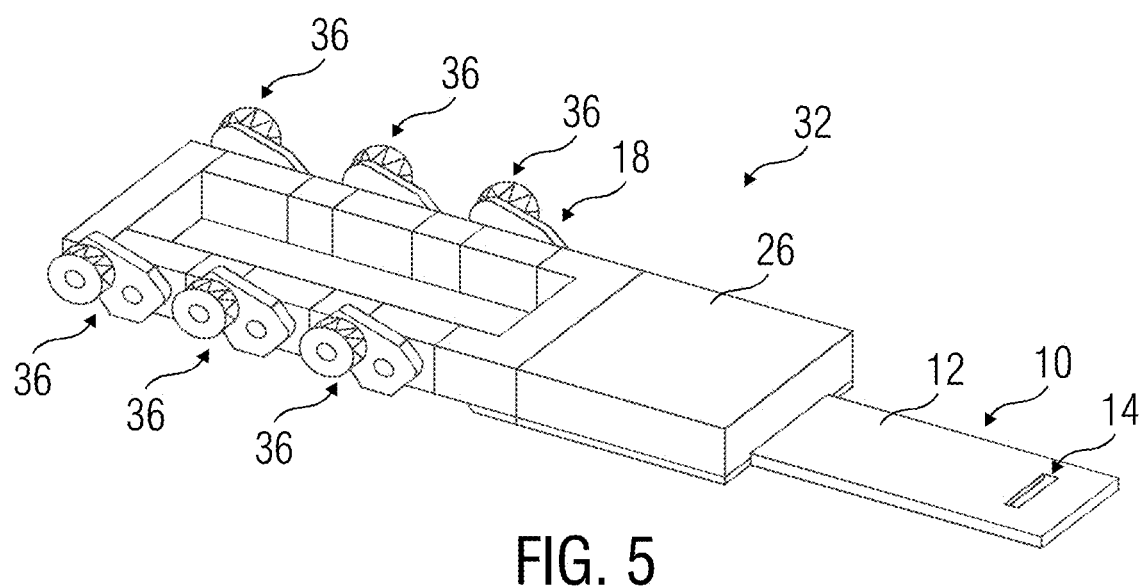
FIG. 5 is a perspective view of attesting arrangement for performing an in-situ adhesion test of a cold spray deposit in accordance with another example of the present invention.
Figure 6:
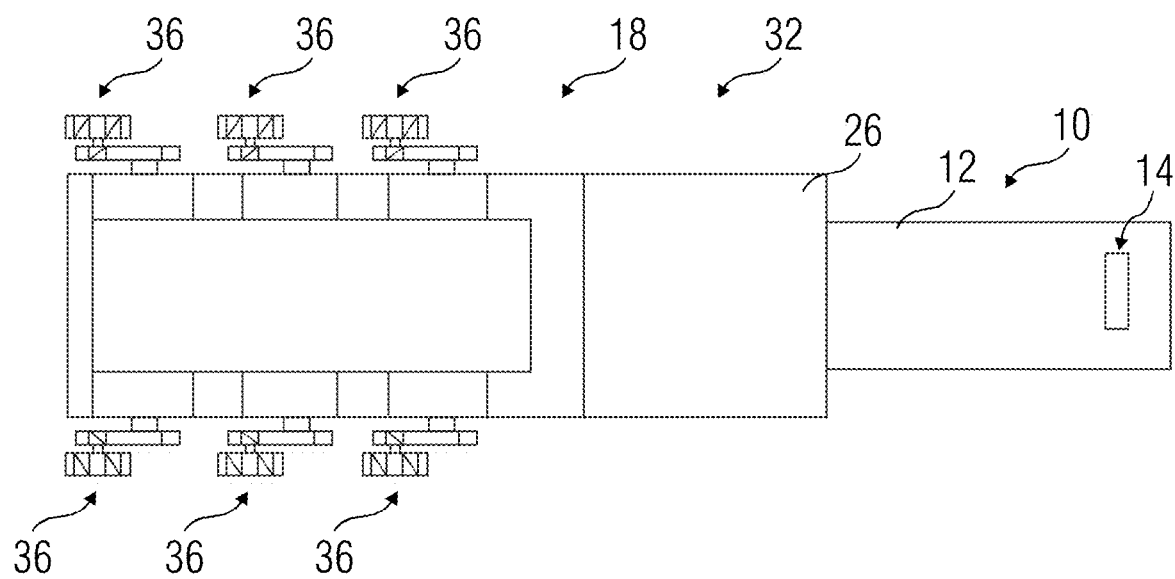
FIG. 6 is a top view of the testing arrangement of FIG. 5.
Figure 7:
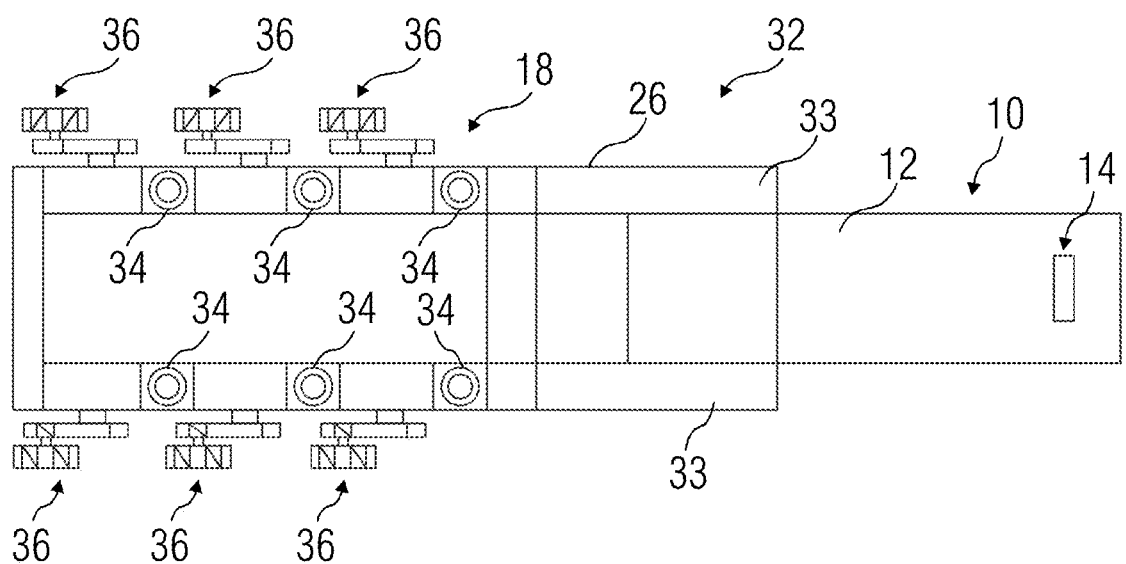
FIG. 7 is a bottom view of the testing arrangement of FIG. 5.
Figure 8:
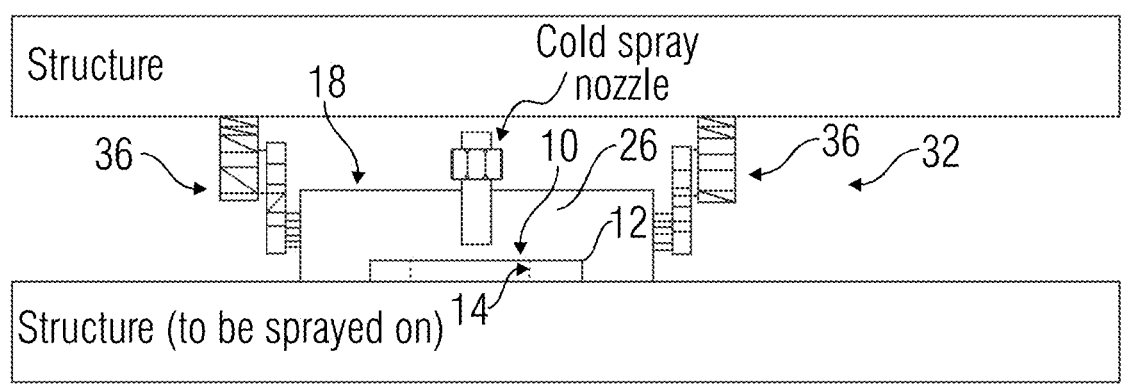
FIG. 8 is a front view of the testing arrangement of FIG. 5 shown positioned in a space within a structure in accordance with one example embodiment of the present invention.

Referring now to the schematic views of FIGS. 3 and 4, loading arrangement 18 includes a connecting portion 26 that is structured to cooperatively engage connecting portion 16 of specimen member 10, a source of mechanical force 28 structured to provide a mechanical force (as shown by the arrow in FIG. 4) in a direction parallel to a longitudinal axis of specimen member 10 and the surface of a structure to which a cold spray deposit is to be applied, and a load cell 30 positioned to measure the force applied to specimen member 10 by source of mechanical force 28. In one example embodiment, source of mechanical force 28 is a mechanical actuator and load cell 30 is positioned between source of mechanical force 28 and connecting portion 26 of loading arrangement 18.

Continuing to refer to FIGS. 3 and 4, in use, specimen member 10 and loading arrangement 18, collectively referred to herein as testing arrangement 32, is inserted into a gap or annulus in a structure (e.g., in an annulus between two concentric cylinders such as to access a loaded spent fuel canister, or within the diameter of a pipe) along with a suitable cold spray nozzle and suitable delivery tube/conduit for supplying a quantity of a cold sprayed material onto specimen member 10. Testing arrangement 32 is manipulated such that specimen member 10, and more particularly the number of apertures 14 defined therein, are positioned on a desired location on the surface of the structure on which the cold spray material is to be applied. Once the number of apertures 14 of specimen member 10 are positioned in the desired positioning with respect to the structure to which the cold spray material is to be applied, such as shown in FIG. 3, a sufficient quantity of cold spray material is provided by cold spray nozzle onto specimen member 10 such that the underlying surface of the structure below the number of apertures 14 is coated and the number of apertures 14 are filled with cold spray material such that cold spray material slightly overlaps onto specimen member 10 (without overlapping further onto the underlying beyond the perimeter specimen member 10), such as shown in FIG. 4. This may require rastering or otherwise moving the nozzle in a pre-programmed path with the same speed and pitch as what the actual deposit would be applied, both in order to completely fill the number apertures 14 and to ensure consistency between the test deposit and the actual deposit. Once the quantity of cold spray material has been provided, specimen member 10 is bonded to the underlying surface of the structure to be coated by an area of the cold spray material in the size of the number of apertures 14.

After specimen member 10 has been successfully bonded to the underlying structure via the cold spray material, a tensile force is then applied to specimen member 10 causing shear stress at the interface of the deposit and surface of the structure until mechanical failure of the deposit (i.e., debonding of the deposit of the cold spray material from the structure of the surface). This force is applied by source of mechanical force 28 which is typically located at the end of loading arrangement 18 and testing arrangement 32 external to the structure to which the deposit was applied. The force applied by source of mechanical force 28 is measured and recorded by load cell 30. As the size, quantity and shape of number of apertures 14 will control the dimensions of the spray deposit and the geometry of interaction between specimen member 10 and the underlying structure, the force and cross-sectional area of the deposit can be used to determine a shear stress at failure. After such failure has occurred, testing arrangement 32 may be removed from the structure or repositioned if another test is desired.

It is to be appreciated that the only area that is actually tested is the interface between the cold spray deposit inside the number of apertures 14 and the underlying substrate. The overspray above the number of apertures 14 has no effect on the measurement.

A more detailed example of a portion of one testing arrangement 32 in accordance with one example embodiment of the present invention is illustrated in FIGS. 5-8, in which portions previously described are labeled with corresponding numerals such as previously utilized. Testing arrangement 32 utilizes a specimen member 10 such as previously described. Connecting portion 26 of loading arrangement 32 has removable slide bearings (e.g., without limitation, plastic or soft metals such as aluminum) to allow for gliding of connecting portion 26 on the target surface with minimal scuffing. Loading arrangement 18 also includes a number of roller members 34 positioned so as to assist in moving test specimen 10 along the underlying surface of the structure. In the example illustrated in FIGS. 5-8, roller members 34 are spherical roller bearings which allow for easy positioning of specimen member 10 on the target surface without scratching the surface. Loading arrangement 18 further includes a number of roller guides 36 under tension and that are biased away from loading arrangement 18 so as to ride against the overlying structure and thus generally force connecting portion 26 of loading arrangement 18 and specimen member 10 connected thereto to be flush against the target surface. The tensioning of the roller guides 36 can be done using a number of different mechanisms, but in this embodiment, the roller guides push against the overlaying structure by spring tension. A cold spray nozzle and related feed/control elements may also be provided as a portion of testing arrangement 32.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

Various aspects of the subject matter described herein are set out in the following examples.

Example 1

A testing arrangement for performing an in-situ adhesion test of a cold spray deposit on a surface of a structure, the testing arrangement comprising a specimen member comprising a number of apertures defined therein and a loading arrangement coupled to the specimen member, the loading arrangement being configured to provide a mechanical force of a known magnitude to the specimen member.

Example 2

The testing arrangement of Example 1, wherein the number of apertures comprises a single rectangular shaped aperture.

Example 3

The testing arrangement of Examples 1 or 2, wherein the specimen member comprises a flat rectangular bar.

Example 4

The testing arrangement of any one of Examples 1 or 3, wherein the number of apertures comprises a plurality of apertures.

Example 5

The testing arrangement of Example 4, wherein the plurality of apertures are arranged in a predetermined pattern.

Example 6

The testing arrangement of any one of Examples 1-5, wherein the specimen member comprises a connecting portion engaged by a correspondingly shaped connecting portion of the loading arrangement.

Example 7

The testing arrangement of any one of Examples 3-5, wherein the specimen member comprises a connecting portion engaged by a correspondingly shaped connecting portion of the loading arrangement, wherein the connecting portion of the specimen member comprises a raised portion having a loading face that extends upward from the rectangular bar.

Example 8

The testing arrangement of any one of Examples 1-7, wherein the loading arrangement comprises a mechanical actuator that provides the mechanical force and a load cell that determines the mechanical force provided by the mechanical actuator.

Example 9

The testing arrangement of any one of Examples 1-8, wherein the loading arrangement comprises a number of roller members structured to engage the surface of the structure.

Example 10

The testing arrangement of Example 9, wherein the loading arrangement comprises a number of spring-loaded roller guides structured to engage another surface of the structure disposed opposite the surface of the structure.

Example 11

A method of performing an in-situ adhesion test of a cold spray deposit on a structure, the method comprising positioning a testing arrangement such as recited in claim 1 with respect to a surface of the structure, depositing the cold spray deposit on the surface of the structure, and testing the adhesion of the cold spray deposit to the surface.

Example 12

The method of Example 11, wherein depositing the cold spray deposit on the surface of the structure comprises providing a quantity of a cold spray material through the number of apertures and onto the surface.

Example 13

The method of Example 12, wherein providing a quantity of a cold spray material through the number of apertures and onto the surface comprises spraying the quantity of the cold spray material.

Example 14

The method of any one of Examples 11-13, wherein testing the adhesion of the deposit to the surface comprises determining the number of apertures are filled to a predetermined level prior to carrying out the testing and applying a known mechanical force to the test specimen until the cold spray deposit is unbonded from the surface.

Example 15

A testing arrangement for performing an in-situ adhesion test of a cold spray deposit on a surface of a structure, the testing arrangement comprising a specimen member comprising an aperture defined therein and a loading arrangement operably coupled to the specimen member, the loading arrangement configured to provide a mechanical force to the specimen member.

Example 16

The testing arrangement of Example 15, wherein the specimen member comprises a connecting portion engaged by a correspondingly shaped connecting portion of the loading arrangement.

Example 17

The testing arrangement of Example 16, wherein the connecting portion of the specimen member comprises a raised portion having a loading face.

Example 18

The testing arrangement of any one of Examples 15-17, wherein the loading arrangement comprises a mechanical actuator configured to apply the mechanical force and a load cell configured to determined the mechanical force provided by the mechanical actuator.

Example 19

The testing arrangement of any one of Examples 15-18, wherein the loading arrangement comprises a number of roller members structured to engage the surface of the structure.

Example 20

The testing arrangement of Example 19, wherein the loading arrangement comprises a number of spring-loaded roller guides structured to engage another surface of the structure disposed opposite the surface of the structure.

What is claimed is:

1. A testing arrangement for performing an in-situ adhesion test of a cold spray deposit on a surface of a structure, the testing arrangement comprising:
   a specimen member defining a number of apertures, wherein the specimen member is configured to abut the surface of the structure, and wherein the specimen member is configured to be bonded to the surface during the adhesion test with the cold spray deposit; and
   a loading arrangement coupled to the specimen member, the loading arrangement being configured to provide a mechanical force of a known magnitude to the specimen member.

2. The testing arrangement of claim 1, wherein the number of apertures comprises a single rectangular shaped aperture.

3. The testing arrangement of claim 1, wherein the specimen member comprises a flat rectangular bar.

4. The testing arrangement of claim 3, wherein the specimen member comprises a connecting portion engaged by a correspondingly shaped connecting portion of the loading arrangement, wherein the connecting portion of the specimen member comprises a raised portion having a loading face that extends upward from the flat rectangular bar.

5. The testing arrangement of claim 1, wherein the number of apertures comprises a plurality of apertures.

6. The testing arrangement of claim 5, wherein the plurality of apertures are arranged in a predetermined pattern.

7. The testing arrangement of claim 1, wherein the specimen member comprises a connecting portion engaged by a correspondingly shaped connecting portion of the loading arrangement.

8. The testing arrangement of claim 1, wherein the loading arrangement comprises a mechanical actuator that provides the mechanical force and a load cell that determines the mechanical force provided by the mechanical actuator.

9. A testing arrangement for performing an in-situ adhesion test of a cold spray deposit on a surface of a structure, the testing arrangement comprising:
   a specimen member defining a number of apertures; and
   a loading arrangement coupled to the specimen member, the loading arrangement being configured to provide a mechanical force of a known magnitude to the specimen member, and wherein the loading arrangement comprises a number of roller members structured to engage the surface of the structure.

10. The testing arrangement of claim 9, wherein the loading arrangement comprises a number of spring-loaded roller guides structured to engage another surface of the structure disposed opposite the surface of the structure.

11. A method of performing an in-situ adhesion test of a cold spray deposit on a structure, the method comprising:
    positioning a testing arrangement with respect to a surface of the structure, wherein the testing arrangement comprises:
       a specimen member defining a number of apertures; and
       a loading arrangement coupled to the specimen member, the loading arrangement being configured to provide a mechanical force of a known magnitude to the specimen member;
    depositing the cold spray deposit on the surface of the structure; and
    testing the adhesion of the cold spray deposit to the surface.

12. The method of claim 11, wherein depositing the cold spray deposit on the surface of the structure comprises providing a quantity of a cold spray material through the number of apertures and onto the surface.

13. The method of claim 12, wherein providing a quantity of a cold spray material through the number of apertures and onto the surface comprises spraying the quantity of the cold spray material.

14. The method of claim 11, wherein testing the adhesion of the cold spray deposit to the surface comprises:
    determining the number of apertures are filled to a predetermined level prior to carrying out the testing; and
    applying a known mechanical force to the specimen member until the cold spray deposit is unbonded from the surface.

15. A testing arrangement for performing an in-situ adhesion test of a cold spray deposit on a surface of a structure, the testing arrangement comprising:
- a specimen member defining an aperture, wherein the specimen member is configured to abut the surface of the structure, and wherein the specimen member is configured to be bonded to the surface during the adhesion test with the cold spray deposit; and
- a loading arrangement operably coupled to the specimen member, the loading arrangement configured to provide a mechanical force to the specimen member.

16. The testing arrangement of claim 15, wherein the specimen member comprises a connecting portion engaged by a correspondingly shaped connecting portion of the loading arrangement.

17. The testing arrangement of claim 16, wherein the connecting portion of the specimen member comprises a raised portion having a loading face.

18. The testing arrangement of claim 15 wherein the loading arrangement comprises a mechanical actuator configured to apply the mechanical force and a load cell configured to determine the mechanical force provided by the mechanical actuator.

19. A testing arrangement for performing an in-situ adhesion test of a cold spray deposit on a surface of a structure, the testing arrangement comprising:
- a specimen member defining an aperture; and
- a loading arrangement operably coupled to the specimen member, the loading arrangement configured to provide a mechanical force to the specimen member, and wherein the loading arrangement comprises a number of roller members structured to engage the surface of the structure.

20. The testing arrangement of claim 19, wherein the loading arrangement comprises a number of spring-loaded roller guides structured to engage another surface of the structure disposed opposite the surface of the structure.

21. A method, comprising:
- positioning a specimen member on a surface of a structure, the specimen member defining an aperture;
- depositing a cold spray deposit on the surface of the structure through the aperture; and
- testing the adhesion of the cold spray deposit to the surface.

22. The method of claim 21, wherein testing the adhesion of the cold spray deposit comprises applying, with a loading arrangement, a mechanical force to the specimen member to unbond the cold spray deposit from the surface.

23. The method of claim 22, wherein the loading arrangement comprises a number of roller members structured to engage the surface of the structure.

24. The method of claim 21, wherein depositing the cold spray deposit on the surface of the structure through the aperture comprises depositing, with a cold spray nozzle, the cold spray deposit on the surface of the structure through the aperture.

25. The method of claim 21, wherein the specimen member comprises a bar.

* * * * *